(12) United States Patent
Darby

(10) Patent No.: US 8,139,752 B2
(45) Date of Patent: Mar. 20, 2012

(54) VOICE CONFERENCE CONTROL FROM AN INSTANT MESSAGING SESSION USING AN AUTOMATED AGENT

(75) Inventor: Matthew Darby, San Francisco, CA (US)

(73) Assignee: Ubiquity Software Corporation Limited, Cardiff (GB)

( * ) Notice: Subject to any disclaimer, the term of this patent is extended or adjusted under 35 U.S.C. 154(b) by 1632 days.

(21) Appl. No.: 11/495,018

(22) Filed: Jul. 28, 2006

(65) Prior Publication Data

US 2008/0043986 A1    Feb. 21, 2008

(51) Int. Cl.
*H04M 3/00* (2006.01)
*H04M 5/00* (2006.01)

(52) U.S. Cl. .............. 379/265.02; 379/201.12; 709/204; 709/229

(58) Field of Classification Search ............. 379/265.02, 379/88.17–88.22, 201.12; 709/229, 204; 380/255

See application file for complete search history.

(56) References Cited

U.S. PATENT DOCUMENTS

| | | | |
|---|---|---|---|
| 7,412,527 B2 * | 8/2008 | Pulver et al. | 709/229 |
| 7,603,413 B1 * | 10/2009 | Herold et al. | 709/204 |
| 2003/0126207 A1 * | 7/2003 | Creamer et al. | 709/204 |
| 2004/0240642 A1 * | 12/2004 | Crandell et al. | 379/88.22 |
| 2005/0138132 A1 * | 6/2005 | Zhou et al. | 709/207 |
| 2005/0238156 A1 * | 10/2005 | Turner | 379/202.01 |
| 2007/0043878 A1 * | 2/2007 | Carlson et al. | 709/246 |
| 2007/0116224 A1 * | 5/2007 | Burke et al. | 379/201.12 |
| 2007/0172063 A1 * | 7/2007 | Biggs et al. | 380/255 |

* cited by examiner

*Primary Examiner* — Quynh Nguyen
(74) *Attorney, Agent, or Firm* — Chapin IP Law, LLC

(57) ABSTRACT

A system and method for using one communication mode, such as instant messaging, to initiate and manage an alternative communication mode conversation. In one exemplary embodiment, an automated agent transfers conversation participants from an instant messaging conversation to a voice conversation by accepting an instant message command from a conference organizer and interacting with a voice conversation platform to call the instant messaging conversation participants on the telephone. One or more conversation participants can manipulate the conversation via commands to the automated agent using the first communication mode.

16 Claims, 5 Drawing Sheets

VOICE CONFERENCE CONTROL FROM AN INSTANT MESSAGING SESSION USING AN AUTOMATED AGENT

TECHNICAL FIELD

The invention relates generally to communication and, more particularly, to a system and method for establishing communication, controlling communication, and/or changing communication modes between one form of communication, such as instant messaging, and another form of communication, such as conference calling.

BACKGROUND OF THE INVENTION

Traditionally, communication modes exist as a hierarchy where face to face communication is generally the richest form of communication and email, which is asynchronous, is a much less rich type of communication. Instant messaging ("IM") and telephone communication fits somewhere between face to face and email communications. Problems can arise when one form of communication no longer suits the needs of the communicators.

For instance, an individual might engage in an IM conversation with another person, and begin to discuss an aspect of business. As the discussion develops, the original communicators need additional information for the discussion, and add more people into the IM conversation. Soon, the IM group finds themselves discussing important and complicated business concepts. The group decides that IM is no longer the best form of communication for the situation and desires richer conversation modes, for instance, the telephone. At this point, the members of the group would have to somehow convey to each other that they desire a telephone conference. Each person would need to send his/her contact information to a conference coordinator to set up a conference call, or alternatively, an individual would need to set up a conference bridge number and send it out to all of the communicators so that they could call in and start the conference. Given the hassle of starting a conference call, the members might postpone the conversation for later or choose to remain communicating via IM when they should use a richer communication mode.

BRIEF SUMMARY OF THE INVENTION

The present invention provides systems and methods to allow users in one communication mode to be able to initiate and/or manage an alternative communication mode using an automated agent that operates from within the framework of the first communication mode. For example, one or more users of a first communication mode communicate with an automated agent in the first communication mode, directing the agent to facilitate an alternative communication mode conversation. In some embodiments, an automated software agent interfaces with a first communication mode platform and with an alternative communication mode platform. Alternative communication mode platform may manipulate the alternative communication mode conversation via commands from one or more users transmitted via the agent. Systems and methods for archiving information related to conversations may be included, as well as systems and methods for facilitating billing and providing security.

In one embodiment of the present invention, the first communication mode is instant messaging (IM), while in other embodiments, the first communication mode is another form of electronic communication, including interactive networks (e.g., myspace.com), blogs, forums, and e-mail. In some embodiments, the second communication mode includes, without limitation, telephone, IP phone, cell phone, video conferencing, web casting, and email. The automated agent may work within the infrastructure of the first communication mode. In some embodiments, the agent exists on a client system (i.e., on a personal computer), while in other embodiments, it comprises server-based software. One or more users in the first communication mode can control the alternative communication mode conversation by interacting with the automated agent. In some embodiments, only certain defined users, such as a conversation organizer, may control the alternative conversation, while in other embodiments, some or all of the conversation participants may have the ability to control the conversation to varying degrees.

In one embodiment of the present invention, the first communication mode is IM, and the automated agent is a piece of software commonly referred to as an Instant Messaging Robot ("Robot"). The Robot interacts with other users in a similar manner as a human would in the IM conversation, but it is a piece of software to which a user can type messages and it will respond to the user. In some embodiments, an IM user adds the Robot into his IM conversation. The Robot appears on IM participant's computer screen to be another person added into the IM conversation, but in reality, it is the Robot that accepts instructions from one or more of the IM users to perform a variety of tasks for the group. In addition, in some embodiments, the Robot accepts an IM message from an IM user directing the Robot to initiate a conversation in an alternative communication mode for multiple individuals in an existing IM conversation. The Robot accepts the instruction and initiates an alternative communication mode conversation, such as a voice or video conversation. Further, in some embodiments, the Robot can manage the ongoing conversation based on instructions from IM users. In embodiments where the Robot is server-based software, the IM users do not need to install any software on their machine—one or more IM users simply add the Robot into the IM conversation, just like adding any other "buddy" to the conversation.

As can be appreciated from the above descriptions, in various embodiments, a user may interact with the automated agent from within the framework of the first communication mode, making the messaging channels very simple. For example, in an embodiment involving an IM Robot, the IM Robot does away with the need for an out of band messaging channel because IM users can do everything using the existing IM infrastructure and the existing IM channel. In computer terms, the IM conversation already uses an open port and TCP connection, and the existing port and TCP connection can be reused to control the alternative conversation mode facilitation instead of opening a separate communication signaling channel, which can be burdensome and less efficient.

Users in the first conversation mode can control the alternative communication mode conversation interactively and intuitively by interacting with the automated agent in real time while the automated agent holds the space of the conversation. As only one example, in one embodiment, a user with the ability to control the conversation can direct the agent to keep certain people out of the conversation, or to add people into the conversation, and the agent will act accordingly. In some embodiments, a user can direct the agent to display or broadcast information about the current alternative communication mode conversation, and the agent will report back details of the conversation such as who is in the conversation, how long the conversation has been going on, etc. In one sense, the automated agent is like an automaton interacting with users in a first communication mode, and the agent also has access to a switchboard allowing it to facilitate an alternative mode of conversation for the users.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
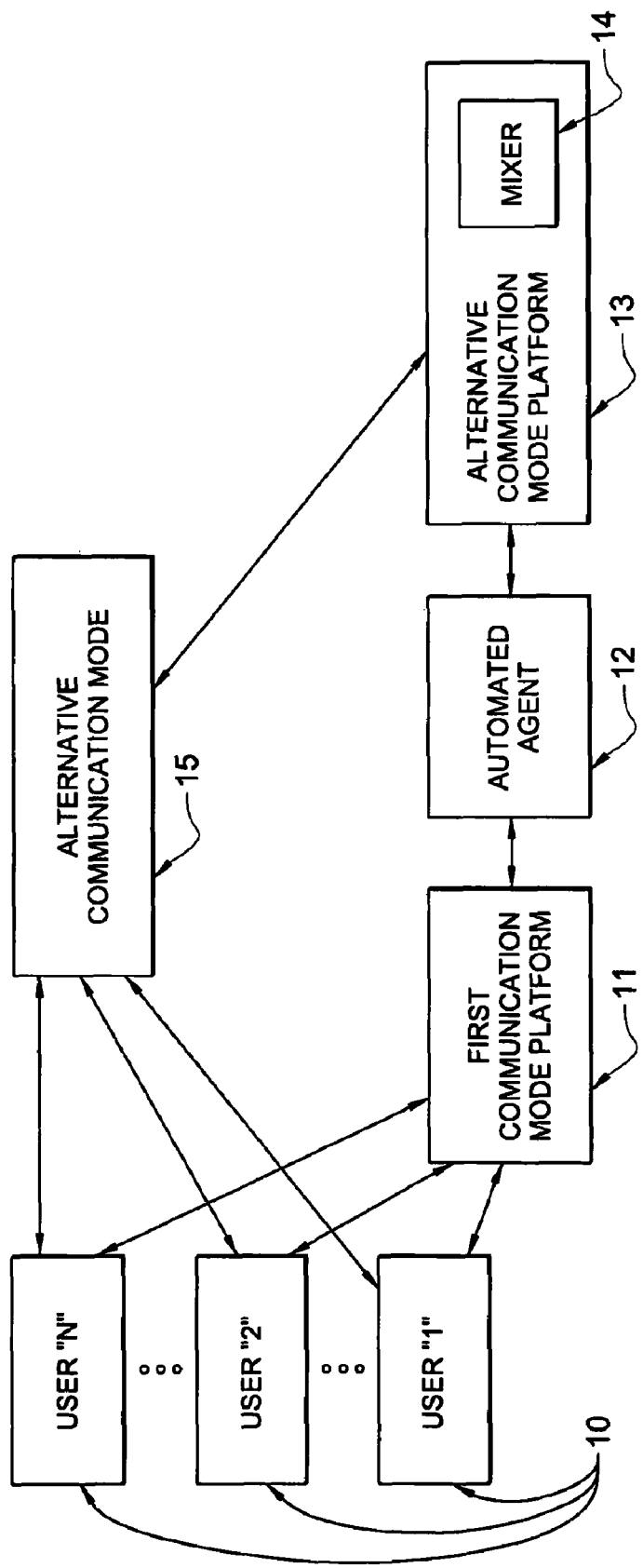
FIG. 1 is a block diagram representing one embodiment of the present invention.

Referring to FIG. 1, one embodiment of the present invention provides automated agent 12 that facilitates a conversation in alternative communication mode 15. Automated agent 12 interacts with users 10 via first communication mode platform 11. At the instruction of user 10, automated agent 12 interfaces with alternative communication mode platform 13 to set up a conversation in alternative communication mode 15. In some embodiments, alternative communication mode platform 13 comprises a number of components, such as mixer 14. In some embodiments, mixer 14 facilitates certain control and manipulation features to the conversation in alternative communication mode 15. Automated agent 12 manages the conversation in alternative communication mode 15 based on instructions from one or more users 10.

In one embodiment of the present invention, users 10 comprise IM users having an IM conversation via first communication mode platform 11, such as may comprise one or more of Microsoft MSN Messenger, Yahoo! Instant Messenger, AOL Instant Messenger, etc. Automated agent 12 may be software, such as an IM Robot, and is in communication with first communication mode platform 11. Accordingly, automated agent 12 may comprise code for accepting commands (preferably in natural language or quasi-natural language), data, and other information via an IM platform and converting these commands to instructions operable to cause alternative communication mode platform 13, such as a conference calling system, to respond in accordance with the commands. Similarly, automated agent 12 may comprise code for accepting responses, data, and other information from alternative communication mode platform 13 and converting this information for presentation to users 10 of first communication mode platform 11 consistent with the native communications protocols of first communication mode platform 11 (e.g., IM platform) (preferably in natural language or quasi-natural language). In some embodiments, automated agent 12 is server based, but it may be located elsewhere, such as on the client's computer.

Automated agent 12 interfaces with alternative communication mode platform 13 (preferably using interfaces already available for user interaction or other system connections), such as a voice platform to control voice calls. Interaction with alternative communication platform 12 is preferably in a command structure native to the platform. For example, automated agent 12 may listen to voice prompts and issue dual tone multi-frequency (DTMF) responses to alternative communication mode platform 13 in order to carry out commands of user 10, similarly, automated agent 12 may issue voice commands to the alternative communication platform. Of course, where alternative communication mode platform 13 accepts control signals, such as digital signals, automated agent 12 may use such signals to interact with alternative communication mode platform 13.

Alternative communication mode platform 13 may be any available platform, such as those supporting voice, video, or electronic communication. In some embodiments alternative communication mode platform 13 comprises mixer 14, such as a voice mixer that takes the different voice conversations and mixes them together or allows other manipulations to the voices. Mixer 14 may be any available mixer, such as those that facilitate voice or video (or both) conversations. Just as automated agent 12 may be server based or located elsewhere, alternative communication mode platform 13 may be server based or located elsewhere. Server-based components may be advantageous in certain settings because users 10 would not be required to download or use any additional software. Alternative communication mode platform 13 works with automated agent 12 to facilitate users' 10 conversation in alternative communication mode 15.

Automated agent 12 can interface with a plurality of different IM platforms 11, such as Microsoft MSN Messenger, Yahoo! Instant Messenger, AOL Instant Messenger, etc., to enable its use with respect to a wide range of IM systems. using their native protocols, Similarly, automated agent 12 of some embodiments can interface with a plurality of alternative communication mode platforms 13, such as voice conferencing platforms or voice and video platforms. In some embodiments, automated agent 12 can accept a vocabulary of commands and act on the commands on behalf of some or all of IM users 10. Additionally, automated agent 12 is provided with a set of interaction templates so that it can interact with IM user 10 in a natural way as if automated agent 12 were an actual IM user.

Figure 2:
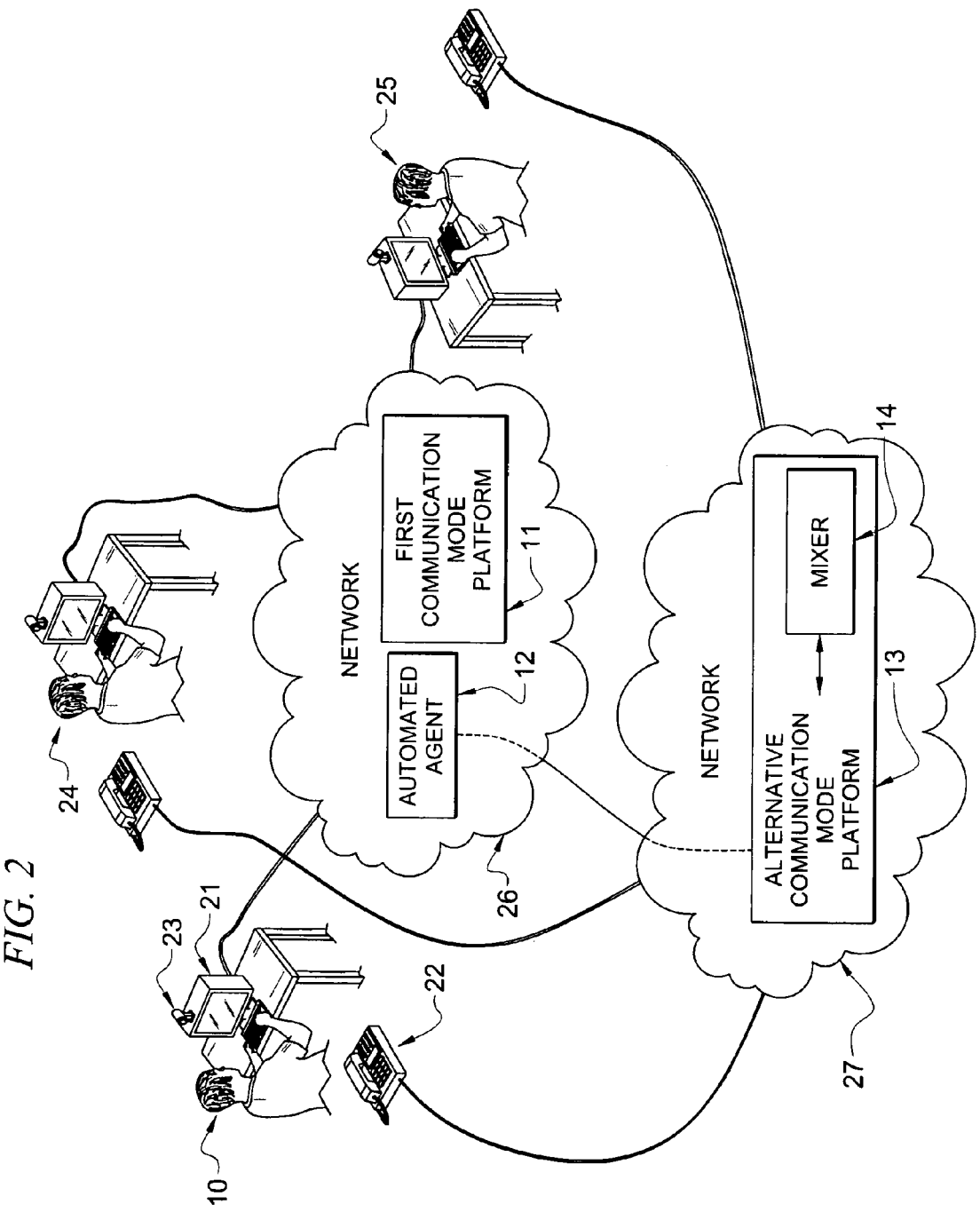
FIG. 2 is a diagram of computer users according to one embodiment of the present invention.

Referring to FIG. 2, IM user 10 participates in an IM conversation using computer 21. In addition to computer 21, IM user 10 has other communication vehicles at his disposal, including audio device 22 and video device 23. Audio device 22 is generically represented as a traditional hard-wired telephone, such as may be coupled to other devices via network 27 (e.g., the Public Switched Telephone Network (PSTN), the internet, LAN, MAN, WAN, cable transmission system, satellite transmission system, and/or the like), but it may also be any available audio communication system including, by way of non-limiting example, a cell phone, internet phone, computer-based phone, Skype, Voice Over IP, or any combination thereof. Similarly, video device 23 may be any available video conferencing system, including, but not limited to, web camera and video camera. Although numerous IM platforms exist, by way of example, IM user 10 initiates an IM conversation by signing on to an IM system and finding other users in his "buddy" list who are online as well. User 10 invites online users 24 and 25 into an IM conversation. IM users 10, 24, and 25 are connected via network 26, which may comprise one or more of a LAN, MAN, WAN, cable transmission system, satellite transmission system, and/or the like. IM user 10 communicates in an IM group with other users 24 and 25 who have communication vehicles at their disposal similar to those of user 10. Automated agent 12 is present and can be added to the IM conversation by a user 10 activating automated agent 12.

Although networks 26 and 27 are shown as separate networks, it should be appreciated that these networks may be overlapping, such as utilizing common communication links. It should be appreciated that, although automated agent 12 and first communication mode platform 11 are illustrated as being disposed in network 27, automated agent 12 and first communication mode platform 11 may be disposed in various configurations, including coupled to network 26. Similarly, although alternative communication mode platform 13 is illustrated as being disposed in network 27, alternative communication mode platform 13 may be disposed in various configurations, including coupled to network 27. The link between automated agent 12 and alternative communication mode platform 13 may be any suitable links, including a link of network 26, a link of network 27, a proprietary link, and combinations thereof.

Figure 3:
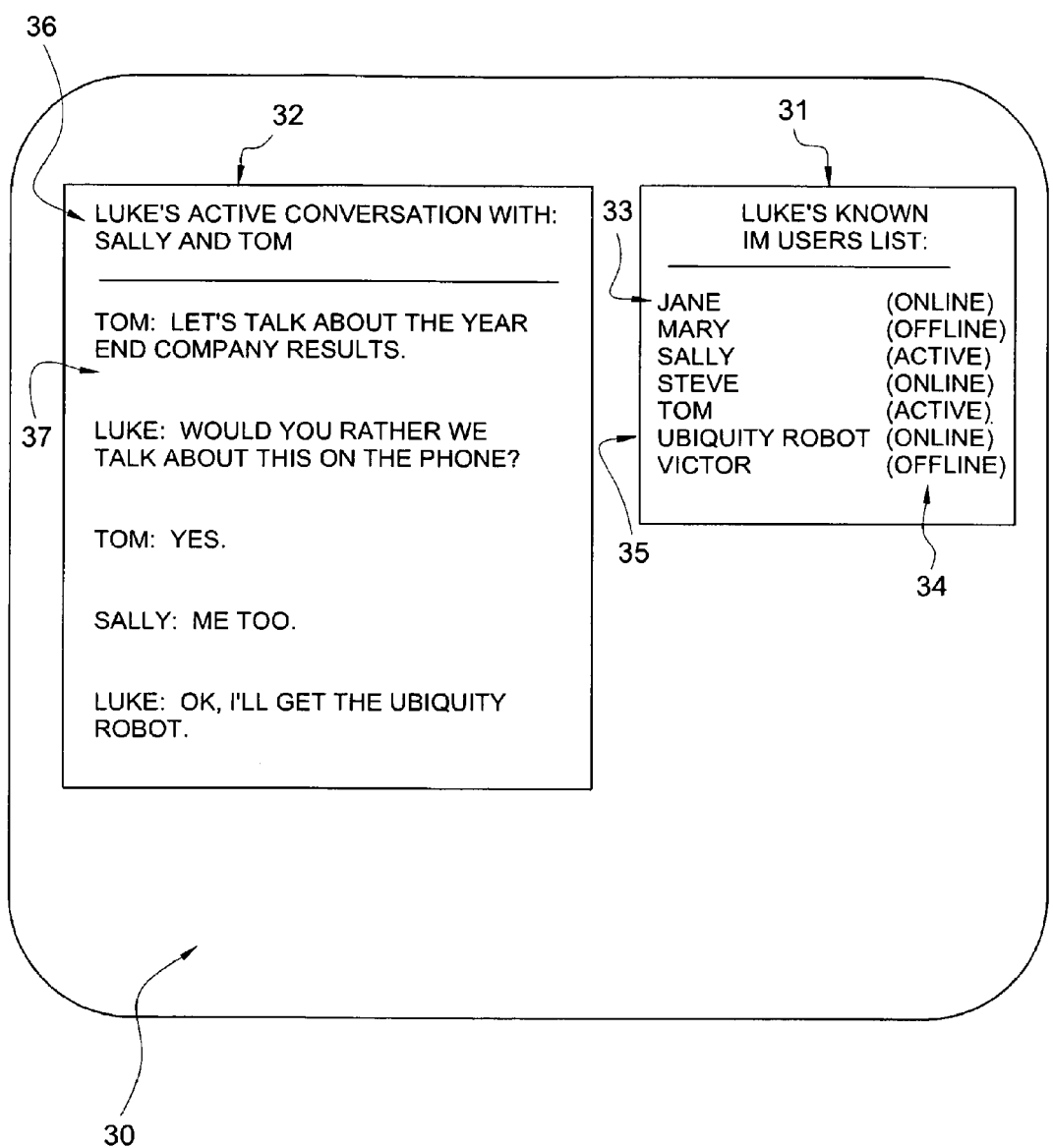
FIG. 3 is a computer screen showing an instant messaging conversation according to one embodiment of the present invention.
Figure 4:
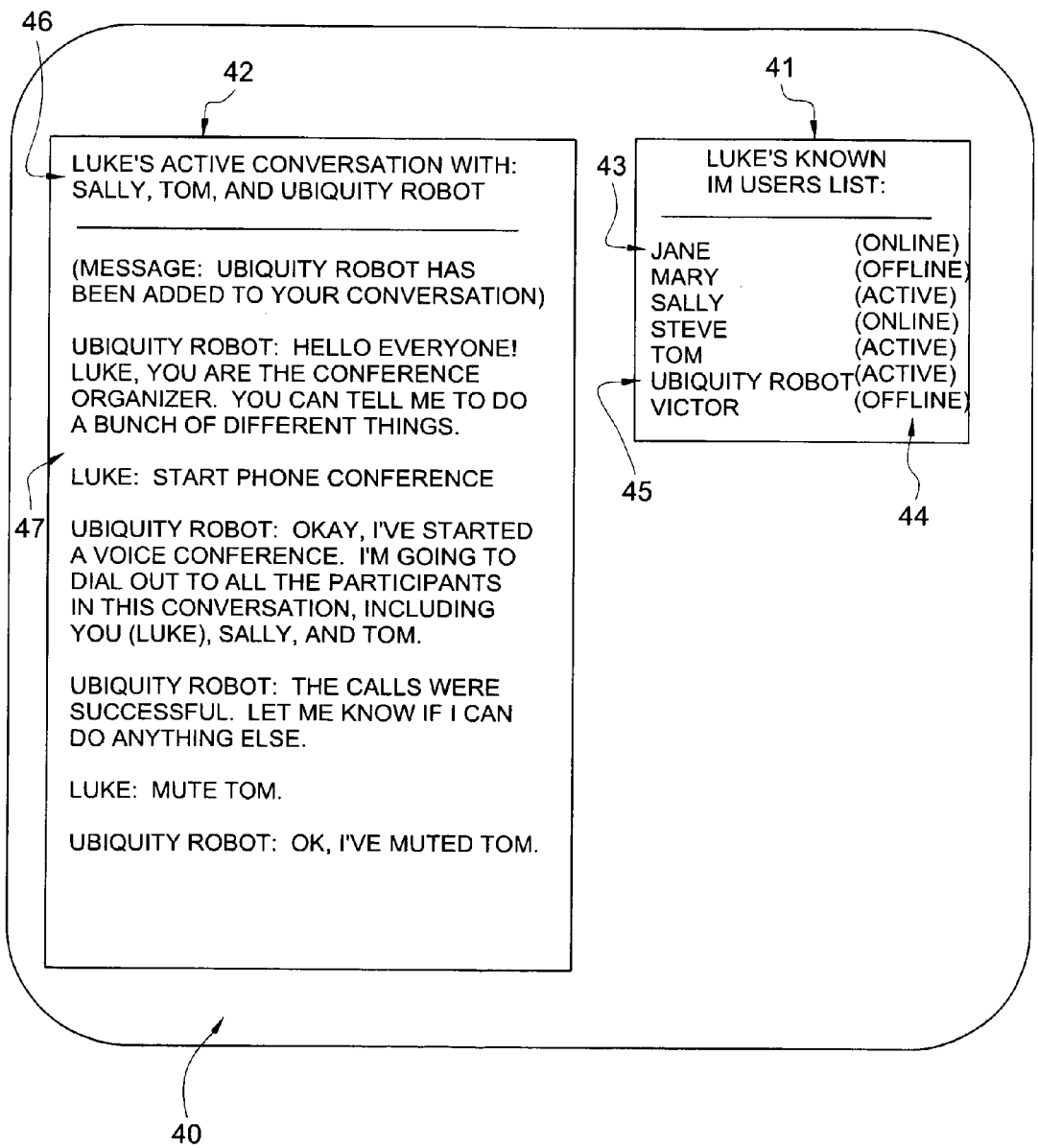
FIG. 4 is a computer screen showing a second instant messaging conversation according to one embodiment of the present invention.

Referring to FIG. 3, computer screen 30 displays an IM conversation for an IM user "Luke," who corresponds to the first IM user 10 in FIG. 1. Screen 30 displays window 31 and active conversation window 32. Window 31 displays a list of Luke's known or frequently-contacted IM users (i.e., a "buddy" list). Of course, windows 31 and 32 can be of various formats, such as in AOL's, Yahoo's, or MSM's IM formats, and additional windows may be provided. Window 31 includes IM users' names 33 and IM users' status indicators 34. For instance, "Jane's" status is online, indicating that she is currently connected to the internet, but is not active in Luke's IM conversation. Window 31 also displays a user named "Ubiquity Robot," (representing automated agent 12 from FIG. 1) as indicated in FIG. 3 at 35. Ubiquity Robot's 35 status is online, indicating that automated agent 12 is available but not a part of Luke's active conversation window 32. Window 32 contains conversation header 36, which in this embodiment lists the names of IM users active in the conversation. In this example, Luke, Sally, and Tom (corresponding to users 10 in FIG. 1) are in an active IM conversation, as also represented in box 51 of FIG. 5. Dialog trail 37 represents part of an IM conversation trail, wherein the dialog indicates that users 10 decide that it is best to continue their discussion by phone and agree to have Luke start a phone conversation via automated agent 12. Of course, the dialogue used in these examples of FIGS. 3 and 4 is purely illustrative and serves as non-limiting examples. Referring also to box 52 of FIG. 5, Luke then adds automated agent 12 to the active IM conversation. Adding automated agent 12 may be accomplished by any manner available in an IM protocol, such as by highlighting, clicking, or dragging Ubiquity Robot into the active conversation window 32.

Referring to FIG. 4, window 41 of screen 40 contains IM user names 43 and status indicators 44. Ubiquity Robot's 45 status 44 now indicates that automated agent 12 is an active participant in Luke, Sally, and Tom's conversation. Similarly, in window 42, conversation header 46 now lists automated agent 12 as an active participant on each user's 10 screen. Dialog trail 47 includes a message, according to a given IM software, on each IM user's 10 screen, that automated agent 12 has been added to the conversation. Automated agent 12 produces a welcome text that greets the IM group and asks Luke what he would like automated agent 12 to do. In the embodiment depicted in FIG. 4, dialog trail 47 demonstrates automated agent 12 wrote, "Hello everyone! Luke, you are the conference organizer. You can tell me to do a bunch of different things." In some embodiments, automated agent 12 may not initially notify other IM users 10 that it has been activated. However, in this example embodiment, Luke is interested in starting a phone conference, and thus types and IM to automated agent 12 directing, "start phone conference," as also indicated by box 53 of FIG. 5. Of course, the commands in this example embodiment are non-limiting examples, and one or more different words or phrases may be used to start a conference or do any number of other actions. In addition, automated agent 12 can organize other types of conferences, including email, video, and computer-based phone conversations. For example, with reference to FIG. 2, automated agent 12 is capable of communication with IM users 10, 24, and 25 and can utilize audio device 22 and video device 23.

Figure 5:
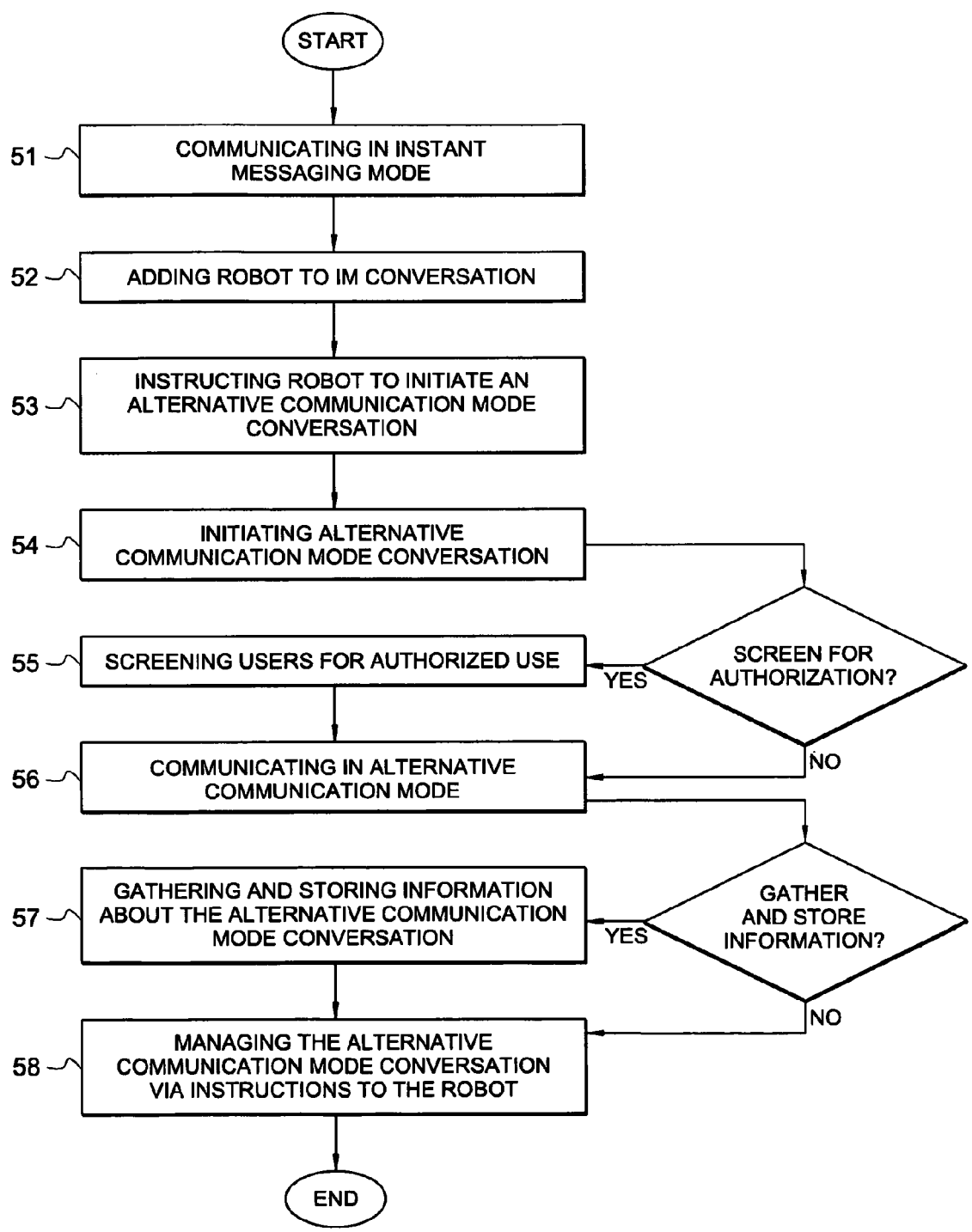
FIG. 5 is a flow chart showing an embodiment of a method of using the present invention.

In one embodiment, as shown in box 54 of FIG. 5, automated agent 12 begins to set up a phone conference. Referring to FIG. 4, automated agent 12 responds, "Okay, I've started a voice conference. I'm going to dial out to all the participants in this conversation, including you (Luke), Sally, and Tom." Automated agent 12 ascertains which IM users 10 are in the active IM conversation using existing IM protocol 11, such as, the information in conversation header 46. Additionally, automated agent 12 will be able to monitor each user's 10 presence and availability using existing IM protocol 11, as indicated in box 57.

Automated agent 12 may gather the IM users' 10 phone numbers any number of ways. For instance, users 10 may have previously registered with automated agent 12, or automated agent 12 may gather the information from IM user's 10 online profile or computer information. If automated agent 12 cannot independently gather needed information, it may simply ask user 10 for her phone number. For instance, automated agent 12 might produce a message to Sally stating, "Hey Sally, I've not seen you before. I don't know what your telephone number is. Can you let me know and I'll store it for future reference?" In response, Sally can type in a telephone number at which she wants to be contacted. Automated agent 12 uses IM users' 10 contact information and voice platform 13 to call each IM user 10.

Once automated agent 12 has started the conversation, users 10 can communicate in the alternative communication mode, as shown in box 56 of FIG. 5. The conversation may be controlled by one or more IM users 10 via automated agent 12, as shown in box 58 of FIG. 5. Automated agent 12 accepts commands from one or more IM users 10 and interacts with alternative communication mode platform 13 and mixer 14 to implement the commands. In some embodiments, automated agent 12 accepts commands only from IM user 10 designated as a conference organizer. In some embodiments, the conference organizer is by default user 10 who initially contacted automated agent 12. Automated agent 12 can detect who the conference coordinator is, for instance, by noting who initially added automated agent 12. In other embodiments, all IM users 10 may have equal control over automated agent 12. In other embodiments, different levels of control corresponding to different subsets of commands exist and can be assigned to different IM users 10. For instance, in one embodiment, each user 10 may be able to mute himself, adjust his volume, or disconnect, but only the conference coordinator can add new participants or mute other users 10. In some embodiments, automated agent 12 can perform any number of tasks via alternative communication mode platform 13 based on user 10 commands, including, but not limited to, adding, dropping, muting, and hiding users 10. In some embodiments, automated agent 12 can soften, amplify, or otherwise distort, users' 10 voices via mixer 14.

As mentioned, in some embodiments, alternative communication mode 15 may comprise other modes, including video and email, or a combination of communication modes. In other embodiments, automated agent 12 sends messages, via email, SMS message, IM, etc., to the IM users 10 with information regarding a conference bridge number and a participant code so the users can call in to a conference. Regardless of the alternative modes used, automated agent 12 can manage a conversation in alternative communication mode 15 for users 10 (while allowing users 10 to continue using the first communication mode) and end the conversation in alternative communication mode platform 15 upon command.

Referring to box 57 of FIG. 5, automated agent 12 may monitor conversation parameters such as length of conversation and each IM user's 10 participation time for record and billing purposes. In some embodiments, automated agent 12 reports the information to one or more IM users 10 during or after a conversation. In other embodiments, automated agent 12 keeps archived records of past conversations and can recall archived information for authorized review. Automated agent 12 may use archived information in a variety of ways, such as, but not limited to, for billing or accounting purposes, or for expediting set-up of repeated conferences, such as conferences that may occur at regular intervals or with a set number of participants. For example, IM user 10 can make reference to a stored conference group and quickly initiate a conference. Automated agent 12 can also contact one or more potential conference participants who may not be actively using IM at the moment to alert them that either it is time for a scheduled conference, or that a conference has been requested by an IM participant. Referring to box 55, in some embodiments, automated agent 12 keeps records relating to security data, such as, but not limited to, authorized users and subscriber lists, privileges, and rates.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system, comprising:
an automated agent, wherein the automated agent interacts with one or more users of a plurality of users communicating electronically using a first communication mode and to facilitate an alternative communication mode conversation for use by two or more users of the plurality of users, the system executing the steps of:
displaying a list of potential participants of an instant messaging conversation, the list including an automated agent that is available for selection as a participant of the instant messaging conversation;
adding the automated agent as a participant of the instant messaging conversation in response to receiving, at a graphical user interface of an instant messaging platform, user input that indicates to add the automated agent as a participant of the instant messaging conversation, the instant messaging platform being a first mode of communication;
receiving an instant message transmitted to the automated agent from a participant of the instant messaging conversation, the instant message having a textual command to be executed by the automated agent, the textual command being a natural language command or quasi natural language command;
in response to receiving the textual command from the instant message to the automated agent, converting the textual command into instructions that cause initiation of a voice conferencing platform as an alternative mode of communication, the voice conferencing platform connecting participants of the instant messaging conversation via a voice conference call;
interfacing with the instant messaging platform and with the voice conferencing platform;
archiving information generated from the first mode of communication and from the alternative mode of communication; and
managing the voice conference call via instant messages received from one or more participants and received by the automated agent.

2. The system of claim 1 wherein the alternative communication mode platform comprises one or more of an audio platform and a video platform.

3. The system of claim 2 wherein the alternative communication mode platform interfaces with a mixer.

4. The system of claim 1 wherein the automated agent facilitates the alternative communication mode conversation based on commands from the one or more users, wherein the commands are sent using the first communication mode.

5. The system of claim 1 wherein the automated agent is server based.

6. The system of claim 1 wherein said automated agent comprises code for accepting responses, data and other information from said alternative communication mode and converts said information for presentation to users of said first communication mode consistent with a native communications protocol for said first communications mode.

7. A method for facilitating communication in an alternative communication mode, said method comprising:
displaying a list of potential participants of an instant messaging conversation, the list including an automated agent that is available for selection as a participant of the instant messaging conversation;

adding the automated agent as a participant of the instant messaging conversation in response to receiving, at a graphical user interface of an instant messaging platform, user input that indicates to add the automated agent as a participant of the instant messaging conversation, the instant messaging platform being a first mode of communication;

receiving an instant message transmitted to the automated agent from a participant of the instant messaging conversation, the instant message having a textual command to be executed by the automated agent, the textual command being a natural language command or quasi natural language command;

in response to receiving the textual command from the instant message to the automated agent, converting the textual command into instructions that cause initiation of a voice conferencing platform as an alternative mode of communication, the voice conferencing platform connecting participants of the instant messaging conversation via a voice conference call;

interfacing with the instant messaging platform and with the voice conferencing platform;

archiving information generated from the first mode of communication and from the alternative mode of communication; and managing the voice conference call via instant messages received from one or more participants and received by the automated agent.

8. The method of claim 7, further comprising screening, by the automated agent, users for authorized use of the automated agent.

9. The method of claim 8, further comprising storing, by the automated agent, information about recurring conversations for quick conversation initiation.

10. The method of claim 9, wherein said automated agent comprises code for accepting responses, data and other information from said alternative communication mode and converts said information for presentation to users of said first communication mode consistent with a native communications protocol for said first communications mode.

11. The method of claim 10, further comprising managing the voice conference call via instant messages received from one or more participants.

12. The method of claim 11, wherein managing the voice conference call includes:

muting a specific recipient in response to receiving an instant message having a command to mute a specific participant from the voice conference call;

removing an identified participant from the conference call in response to receiving an instant message having a command to mute the identified participant from the voice conference call; and identifying, as a conference organizer, a participant that initially sent an instant message to start the conference call.

13. The method of claim 7, wherein the voice conferencing platform connecting participants of the instant messaging conversation via a voice conference call includes the automated agent automatically gathering respective phone numbers of participants of the instant messaging conversation.

14. The method of claim 13, further comprising:

designating a conference organizer;

providing a first level of control of the voice conference call to the conference organizer, the first level of control corresponding to a first set of commands;

providing a second level of control of the voice conference call to participants of the voice conference, the second level of control corresponding to a second set of commands, the second set of commands having fewer commands than the first set of commands; and in response to the automated agent receiving user input, via an instant message requesting information about the conference call, broadcasting information about the voice conference call via the instant messaging conversation including identifying participants and duration of the voice conference call.

15. The method of claim 14, wherein managing the voice conference call includes:

muting a specific recipient in response to receiving an instant message having a command to mute a specific participant from the voice conference call;

removing an identified participant from the conference call in response to receiving an instant message having a command to mute the identified participant from the voice conference call; and identifying, as a conference organizer, a participant that initially sent an instant message to start the conference call.

16. The method of claim 15, further comprising:

screening, by the automated agent, users for authorized use of the automated agent;

the automated agent receiving participant voice input via the conference call, and converting the voice input to text input and presenting the text input to users via the instant messaging conversation;

the automated agent only accepting instant messaging commands from the designated conference organizer; and storing, by the automated agent, information about recurring conversations and using the information about recurring conversations during conversation initiation.

* * * * *